(12) United States Patent
Hochwald et al.

(10) Patent No.: US 7,317,764 B2
(45) Date of Patent: Jan. 8, 2008

(54) METHOD OF SIGNAL TRANSMISSION TO MULTIPLE USERS FROM A MULTI-ELEMENT ARRAY

(75) Inventors: Bertrand M Hochwald, Summit, NJ (US); Christian Bruce Peel, Zurich (CH)

(73) Assignee: Lucent Technologies Inc., Murray Hill, NJ (US)

( * ) Notice: Subject to any disclaimer, the term of this patent is extended or adjusted under 35 U.S.C. 154(b) by 596 days.

(21) Appl. No.: 10/459,900

(22) Filed: Jun. 11, 2003

(65) Prior Publication Data

US 2004/0253986 A1    Dec. 16, 2004

(51) Int. Cl.
*H04K 1/02*     (2006.01)
*H04L 25/03*    (2006.01)
*H04L 25/49*    (2006.01)

(52) U.S. Cl. .................. 375/296; 375/285; 375/232

(58) Field of Classification Search ............. 375/295, 375/299, 296, 285, 232; 341/20, 173; 332/106; 327/291
See application file for complete search history.

(56) References Cited

U.S. PATENT DOCUMENTS

| | | | | |
|---|---|---|---|---|
| 5,388,124 A | * | 2/1995 | Laroia et al. | 375/286 |
| 5,634,199 A | * | 5/1997 | Gerlach et al. | 455/63.1 |
| 6,005,916 A | * | 12/1999 | Johnson et al. | 378/87 |
| 6,134,518 A | * | 10/2000 | Cohen et al. | 704/201 |
| 6,160,757 A | * | 12/2000 | Tager et al. | 367/119 |
| 6,178,389 B1 | * | 1/2001 | Sola et al. | 702/152 |
| 6,243,412 B1 | * | 6/2001 | Fukawa | 375/219 |
| 6,243,425 B1 | * | 6/2001 | Langberg et al. | 375/285 |
| 6,314,135 B1 | * | 11/2001 | Schneider et al. | 375/232 |
| 6,400,761 B1 | * | 6/2002 | Smee et al. | 375/232 |
| 6,952,455 B1 | * | 10/2005 | Banister | 375/267 |
| 7,180,956 B1 | * | 2/2007 | Banister | 375/267 |
| 7,212,582 B2 | * | 5/2007 | Zhang | 375/296 |
| 2002/0083041 A1 | * | 6/2002 | Achlioptas et al. | 707/1 |
| 2002/0193146 A1 | * | 12/2002 | Wallace et al. | 455/562 |
| 2003/0163771 A1 | * | 8/2003 | Tomofuji | 714/48 |
| 2003/0215006 A1 | * | 11/2003 | Raghothaman | 375/220 |
| 2003/0235146 A1 | * | 12/2003 | Wu et al. | 370/203 |
| 2004/0047426 A1 | * | 3/2004 | Nissensohn | 375/259 |

OTHER PUBLICATIONS

Zamir, R., et al., "Nested Linear/Lattice Codes for Structured Multiterminal Binning," IEEE Transactions on Information Theory, vol. 48, No. 6, pp. 1250-1276, Jun. 2002.

Agrell, E., et al., "Closest Point Search in Lattices," IEEE Trans. Information Theory, vol. 48, No. 8, pp. 2201-2214, Aug. 2002.

(Continued)

*Primary Examiner*—Phuong Phu

(57) ABSTRACT

A communication method is provided, in which a data vector u which contains respective signal data destined for each of a plurality of users is transmitted from multiple antennas or other transmitting elements. Prior to transmission, a perturbation vector $\tau l$ is added to the data vector u, in which $\tau$ is a positive real number and each component of the vector l is a complex number whose real and imaginary parts are both integers. This perturbation is beneficial for improving the total rate of data transmission.

10 Claims, 2 Drawing Sheets

OTHER PUBLICATIONS

Damen, O., et al., "*Lattice Code Decoder for Space-Time Codes*," IEEE Communications Letters, vol. 4, No. 5, pp. 161-163, May 2000.

Erez, U, et al., "*Lattice Decoding Can Achieve ½ log(1 + snr) on the AWGN Channel using Nested Codes*," IEEE ISIT2001, Washington, D.C., p. 125, Jun. 24-29, 2001.

Fischer, R.F.H., et al., "*Mimo precoding for decentralized receivers*," in Proc. IEEE ISIT 2002, (Lausanne, Switzerland), p. 496, Jun. 30-Jul. 5, 2002.

Ginis, G., et al., "*A Multi-user Precoding Scheme achieving Crosstalk Cancellation with Application to DSL Systems*," in Conference Record of the Thirty-Fourth Asilomar Conference on Signals, Systems and Computers, vol. 2, pp. 1627-1631, 2000.

Hochwald, B.M., et al., "*Achieving Near-Capacity on a Multiple-Antenna Channel*," IEEE Trans. Communications, vol. 51, No. 3, pp. 389-399, Mar. 2003.

Wesel, R.D., et al., "*Achievable Rates for Tomlinson-Harashima Precoding*," IEEE Trans. Information Theory, vol. 44, pp. 824-830, Mar. 1998.

Windpassinger, C., et al., "*Precoding in Multi-Antenna and Multi-User Communications*," accepted for publication in IEEE Trans. Wireless, 2003.

Yu, W., et al., "*Trellis Precoding for the Broadcast Channel*," Proceedings of 2001 IEEE GlobeCom, pp. 1344-1348, Nov. 2001.

Erez, U., et al., "*Capacity and Lattice-Strategies for Cancelling Known Interference*," ISITA 2000 Presentations, Honolulu, Hawaii, pp. 681-684, Nov. 2000.

Tomlinson, M., "*New Automatic Equaliser Employing Modulo Arithmetic*," Electronics Letters, vol. 7, pp. 138-139, Mar. 25, 1971.

Kusum, J., "*Communicating by Cosets and Applications to Broadcast*," 2002 Proc. Conference on Information Sciences and Systems, Princeton University, Mar. 20-22, 2002.

Kanan, R., "*Improved algorithms for integer programming and related lattice problems*," Proceedings of the ACM Symposium on the Theory of Computing, (Boston), pp. 193-206, Apr. 1983.

Hochwald, B., et al., "*Space-Time Multiple Access: Linear Growth in the Sum Rate*," Proc. 40$^{th}$ Allerton Conference on Computers, Communications and Control, (Monticello, Illinois), Oct. 2002.

Harashima, H., et al., "*MatchedTransmission Technique for Channels With Intersymbol Interference*," IEEE Transactions on Communications, vol. 20, No. 4, pp. 774-780, Aug. 1972.

Fincke, U., et al., "*Improved Methods for Calculating Vectors of Short Length in a Lattice, Including a Complexity Analysis*," Mathematics of Computation, pp. 463-471, Apr. 1985.

\* cited by examiner

METHOD OF SIGNAL TRANSMISSION TO MULTIPLE USERS FROM A MULTI-ELEMENT ARRAY

ACKNOWLEDGEMENT OF GOVERNMENT SUPPORT

This invention was made with Government support under Wireless Initiative Grant CCR-9979452 and Information Technology Grant CCR-0081476 awarded by the National Science Foundation. The Government has certain rights in this invention.

FIELD OF THE INVENTION

This invention relates to the processing of signal data for transmission to multiple users from an array of multiple transmitter elements, using knowledge of the propagation channel. The invention will typically find application in wireless communication, in which the multi-element transmitter array is an array of transmit antennas. However, the invention also has advantageous applications in other kinds of networks, for example in optical networks, or in electrical networks in which an array of wires or cables fans out from a source location.

ART BACKGROUND

One major problem in wireless communication is how to obtain the greatest possible total rate of data transmission on the forward link, also referred to as the downlink, from a base station to its associated users, such as mobile stations, sharing a common frequency channel. Techniques for solving this problem must, among other things, address the interference that arises when the signal information destined for one user is received as an intermixture with signal information that was destined for other users.

Analogous problems occur in the context, e.g., of wireline networks. For example, it often happens that a plurality of electrical cables, each carrying a respective signal, fan out from an enclosure to a plurality of destinations. Within the enclosure, the signals are transported for some distance through an array of electrical conductors coupled closely enough to cause crosstalk. In such environments, the problem of how to maximize the total data-transmission rate must likewise address the problem of interference. Similar problems also arise in multimode optical fiber networks when signals are transmitted to multiple destinations on a common fiber at a common wavelength.

The techniques that provide the background for the present invention have been described mostly in the context of wireless communication. Accordingly, the below discussion will focus on techniques related to wireless communication. However, as will be appreciated by those skilled in the art, similar techniques are readily extended to, e.g., the wireline or optical context.

As is well known, in the absence of interference, a signal x transmitted from one base station antenna to one user will be received as received signal $y=hx+w$, wherein h is a complex number referred to as a "channel coefficient," and w represents additive receiver noise. When an array of multiple base-station antennas transmits a respective signal to each of a plurality of users, each user receives a sum of received signals. Excluding additive receiver noise, each component of such a sum consists of the signal transmitted by one of the base-station antennas, weighted by the channel coefficient from the transmitting antenna to the receiver. As will be readily understood by those skilled in the art, the relationship between all transmitted and all received signals is concisely represented by the matrix equation:

$$y=Hx+w,$$

in which y is a vector of received signals, each component of which relates to a particular user, x is a vector of transmitted signals, each of which relates to a particular transmit antenna at the base station, H is a matrix of channel coefficients, and w is a vector of additive receiver noise, each component of which relates to a particular user.

One known method for removing inter-user interference from the received signals is to precede the signal vector x, before transmission, by multiplying it by the inverse of the channel matrix H. In other words, the transmitted signal vector x is replaced by the preceded vector $x_{pc}=H^{-1}x$. (Strictly speaking, this is valid only when the number of users equals the number of transmit antennas. There are known extensions to other cases.) As a consequence, excluding noise, and assuming that the number of transmit antennas equals the number of users, each user now receives only the signal from one respective transmit antenna. It should be understood that this scenario presupposes that the base station obtains measurements of the channel coefficients, and that these coefficients remain stable over one channel use, i.e., over the time taken to concurrently transmit one complex scalar signal value from each of the transmit antennas.

Although useful, the above-described method of preceding with channel inversion also suffers some disadvantages. For example, theoretical analysis of this preceding method predicts that when the channel coefficients are randomly distributed (more specifically, complex-Gaussian distributed with zero mean and unit variance) and the total transmit power is fixed, increasing the number of transmit antennas beyond a single antenna does not substantially increase the total rate of data transmission. This prediction is significant because practical experience has shown that the statistical model on which it is based is at least qualitatively accurate for rich scattering environments.

The performance of the preceded signal can be improved somewhat by applying a technique referred to as "regularizing" the inversion of the channel matrix. In accordance with regularized channel inversion the preceded signal vector is represented by the formula $$x_{rpc}=H^*(HH^*+\alpha I)^{-1}x,$$

where $H^*$ is the complex transpose of the matrix H, $\alpha$ is a selected scalar value, and I is the unit matrix of dimension equal to the number of users. It should be noted that in this formulation, the number of transmit antennas is not required to equal the number of users. However, this formulation is particularly advantageous when the number of transmit antennas equals the number of users in communication with the base station at a given time.

Although useful, preceding by regularized channel inversion also suffers some disadvantages. Although some gain in total transmission rate is achieved, this gain remains significantly smaller than that which is theoretically possible to achieve when the number of transmit antennas is increased. Moreover, although the term $\alpha I$ in the above equation tends to reduce excessive demands for transmit power caused by outlying values of channel coefficients, the same term also tends to cause crosstalk among the received signals.

Thus, there remains a need for signal-conditioning methods that more fully achieve the gains that are theoretically possible in total transmission rate when multiple antennas are used at a base station or other source for distributing multiple signals to multiple users.

SUMMARY OF THE INVENTION

We have found such a conditioning method. According to our new method, each data value to be transmitted from a respective antenna is additively offset, or "perturbed," by a multiple of a complex number having integer coefficients. Because the perturbation values can be concisely expressed as a vector to be added to the vector of data values, we refer to this process as "vector perturbation." If precoding is also to be carried out, it is carried out after vector perturbation.

It will be convenient to explain vector perturbation in more detail with reference to the complex data vector u whose components are the data values to be transmitted, after appropriate normalization, from the respective transmit antennas. (The vector u represents the source data for the signal vector x discussed above.) Vector perturbation is carried out by adding to u a vector $\tau l$, in which $\tau$ is a positive real number and each component of the vector l is a complex number whose real and imaginary parts are both integers. (The term "complex number" subsumes pure real and pure imaginary numbers as special cases.) For appropriate values of the coefficient $\tau$, each receiver can apply a modulo function that effectively subtracts out the perturbation and restores, in approximation, the unperturbed version of the data value destined for transmission to that receiver. The vector l is advantageously designed to lead to minimal, or at least relatively small, values of the total signal energy.

Accordingly, the invention in one embodiment involves providing a data vector u which contains respective signal data destined for each of a plurality of users, conditioning the data vector, and transmitting the conditioned data vector from an array of multiple transmission elements. The conditioning step includes adding a perturbation vector $\tau l$ to the data vector u, in which $\tau$ is a positive real number and each component of the vector l is a complex number whose real and imaginary parts are both integers.

In specific embodiments of the invention, the conditioning step includes precoding the data vector after adding the perturbation vector. In some exemplary embodiments, the precoding is carried out by multiplying the data vector by an inverse of the channel matrix. In other exemplary embodiments, the precoding is carried out by regularized channel inversion.

DETAILED DESCRIPTION

As noted above, the methods to be described here have application to network communication of various kinds, including communication in, e.g., wireline networks. However, for purposes of illustration, the description that follows will be directed to implementations in the forward link of a wireless network.

Figure 1:
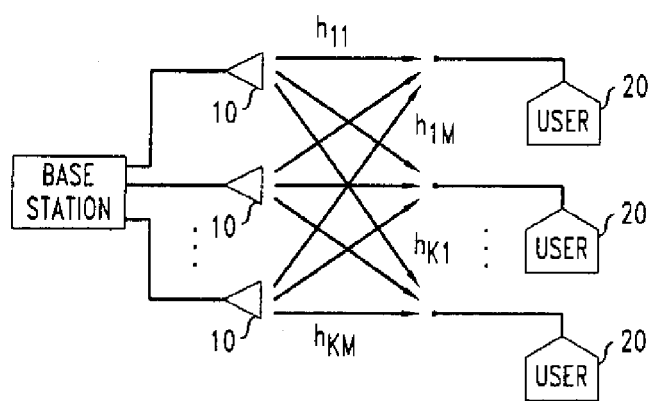
FIG. 1 conceptually depicts a cell of a wireless communication system.

FIG. 1 depicts a base station with M transmit antennas 10 in communication, at a given time, with K users 20, which are, e.g., mobile stations. M and K are positive integers. Also indicated in the figure are some of the channel coefficients $h_{ki}$ that relate a user k to a transmit antenna i, wherein k takes values from 1 to K and i takes values from 1 to M.

The perturbation method to be described will have advantageous applications when M is less than, equal to, or greater than K. When the total number of available users is greater than the number M of transmit antennas, it will often be particularly advantageous to select, for each channel use, a subset of K users equal in number to the transmit antennas, so that M=K. Such selection of users may be random, or it may be dictated by channel conditions so as, for example, to maximize data throughput.

Figure 2:
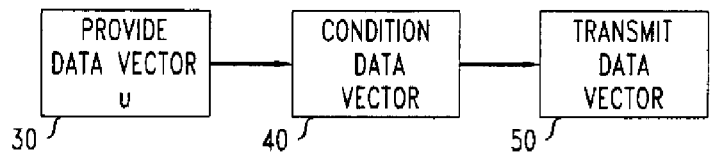
FIG. 2 conceptually depicts various stages in the transmission of a signal according to the invention in illustrative embodiments.

FIG. 2 depicts various stages in the transmission of a signal. At stage 30, a data vector is provided. At stage 40, the data vector is conditioned. Conditioning includes, among other things, modulating the data vector onto a radio-frequency carrier. Conditioning may also include normalization and application of any of various linear transformations, some of which will be described below. At stage 50, the conditioned signal is provided as antenna input, and launched into the air interface.

The data vector at stage 30 may be provided by any of various well-known coding methods. These include, without limitation, 16-, 64-, or 256-QAM, BPSK, and QPSK coding. Each of these, or other, coding techniques will provide, for each channel use, a respective complex scalar signal value for transmission from each of the M antennas.

Figure 3:
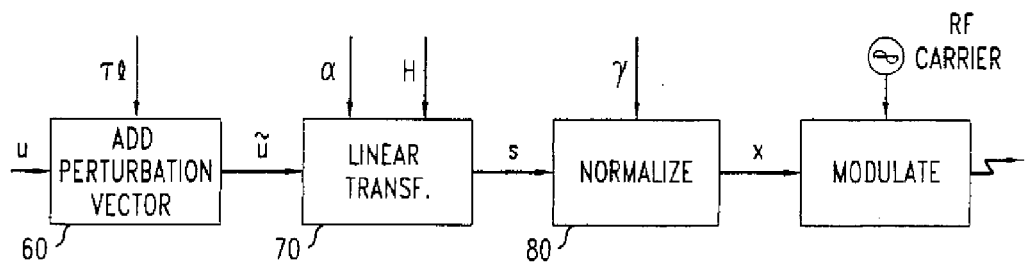
FIG. 3 conceptually depicts further details of the conditioning stage of FIG. 2, in illustrative embodiments.

FIG. 3 depicts further details of the conditioning stage 40 in illustrative embodiments. At block 60, a perturbation vector is added to the data vector as explained in further detail below. At block 70, a linear transformation is applied to the perturbed data vector. At this block, any of various kinds of linear transformation might be applied.

It should be noted in this regard that the methods described here are applicable, inter alia, to networks in which each user has only one antenna, and the users do not cooperate with each other or share information. In such networks, no individual user will, a priori, possess enough information to distinguish the signal it was destined to receive from interfering signals destined for other users. To deal with this problem, it will be particularly advantageous to apply a linear transformation having the ultimate effect that at each user, the receiver is able to individually decode the message destined for that particular user.

For example, the linear transformation may represent channel inversion or regularized channel inversion, as discussed above.

At block 80, the perturbed and linearly transformed vector is normalized. In our discussion, below, we will refer to an unnormalized signal as s, and to a normalized signal as x. Normalization in this context corresponds to a constraint on total signal power. In our mathematical studies, for convenience and without loss of generality, we have assumed unit normalization; that is, $\gamma=E\|s\|^2$ and $x=(\gamma^{-1/2})s$, so that $E\|x\|^2=1$, where "E" denotes the statistical expectation. In certain cases, we have adopted an alternative normalization, in which $\gamma=\|s\|^2$ and $\|x\|^2$ is unity. We have found that in practice, these alternative normalizations are almost equally effective, and so it makes little difference which is chosen.

As noted above, channel inversion suffers certain disadvantages. In mathematical terms, these disadvantages arise because the normalization constant $\gamma$ is likely to be driven to high values by large eigenvalues in the inverse of the channel matrix H. This effect can be mitigated if the data vector is made at least somewhat orthogonal to the eigenvectors associated with the large eigenvalues of the inverse channel matrix. That is the goal of our vector perturbation method.

The perturbed data vector $\tilde{u}$ is derived from the original data vector u according to the equation $$\tilde{u}=u+\tau l.$$

In the above equation, $\tau$ is a positive real number, l is a K-dimensional complex vector, and each component of l has the form a+ib, where both a and b are integers.

Each receiver applies a modulo function which, in effect, repeatedly casts out additive factors of $\tau$ from the received and recovered data value, until there remains a value between $-\tau/2$ and $\tau/2$. This is taken as an approximation of the original, unperturbed data value. The value of $\tau$ is chosen large enough so that all (unperturbed) data values will fall within the range stated above.

Figure 4:
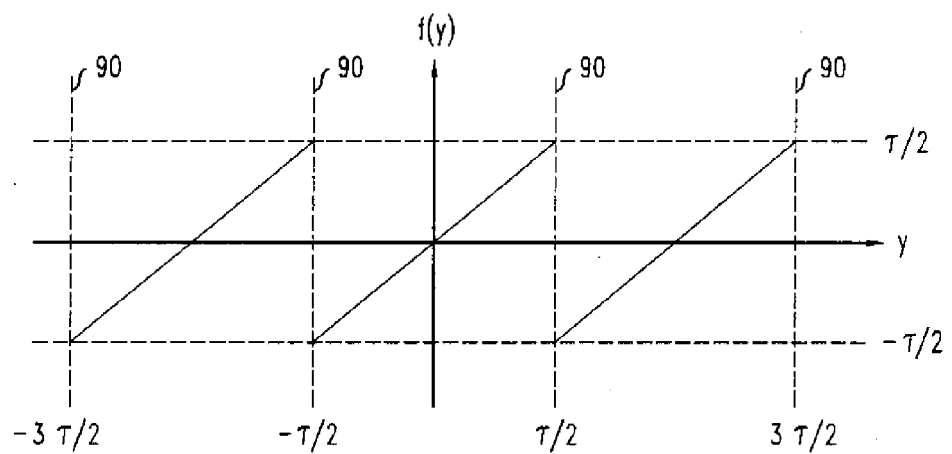
FIG. 4 is a graph of a modulo function useful in the practice of the invention in illustrative embodiments.

The modulo function $f_\tau(y)$, which is graphed in FIG. 4, has the form:

$$f_\tau(y) = y - \left\lfloor \frac{y+\tau/2}{\tau} \right\rfloor \tau,$$

where the expression $\lfloor \ldots \rfloor$ stands for the largest integer less than or equal to the argument enclosed within the brackets. The modulo function is applied separately to the real and imaginary components of y.

If, for example, the perturbed data vector is preceded using simple channel inversion, the signal $y_k$ received by user k will be represented by the scalar equation $$y_k = \frac{1}{\sqrt{\gamma}} \tilde{u}_k + w_k,$$

wherein each variable is the k'th component of the corresponding received signal vector, data vector, and additive noise vector, respectively. We assume that the receivers have determined the normalization $\gamma$, e.g. by receiving it on a control channel from the base station. Therefore, each receiver can readily apply the modulo function in order to estimate the pertinent unperturbed data value. An error will occur if the additive receiver noise pushes the received signal across a symbol decoding boundary, or across one of the vertical boundaries 90 of FIG. 4, which occur at odd integer multiples of $\tau/2$.

If the perturbed data vector is preceded by simple channel inversion, the unnormalized signal vector s is given by $$s=H^{-1}\tilde{u}.$$

One advantageous choice for the vector l is that value that minimizes the signal energy $\|s\|^2$. Various algorithms are known which can solve this problem, or at least can find a value that yields an approximation to the minimum signal energy. Useful algorithms for this purpose are described, for example, in U. Fincke and M. Pohst, "Improved methods for calculating vectors of short lengths in a lattice, including a comlexity analysis," *Mathematics of Computation*, vol. 44, pp. 463-471, April 1985, and in R. Kanan, "Improved algorithms for integer programming and related lattice problems," in *Proceedings of the ACM Symposium on the Theory of Computing,"* (Boston), pp. 193-206, April 1983. A review of various algorithms useful for the same purpose is found in E. Agrell et al., "Closest point searches in lattices," *IEEE Trans. Information Theory*, vol. 48, pp. 2201-2214, August 2002.

Mathematically, the minimization problem is described as the problem of finding that complex, integer-valued vector l for which the following expression is least:

$$(u+\tau l)^*(HH^*)^{-1}(u+\tau l).$$

This belongs to the well-known class of problems referred to as K-dimensional integer-lattice least-squares problems. As noted, many algorithms are known for solving problems in this class. Even a solution by exhaustive searching will be feasible if K is not too large, particularly if the object is not to find an absolute minimum, but only to reduce the signal energy in $s=H^{-1}\tilde{u}$ below the signal energy in $H^{-1}u$.

One particularly useful algorithm in this regard is the Fincke-Pohst algorithm referred to above, which in other contexts is sometimes referred to as a sphere decoder. This algorithm avoids an exhaustive search over all possible integers in the lattice by limiting the search space to a sphere of some given radius around a starting point, namely, the vector u. In its best-known form, the sphere decoder operates on real lattices. Since the lattice pertinent to the present problem is complex, the problem is advantageously converted to a 2K-dimensional real lattice problem. Such a conversion is readily achieved by well-known methods. Alternatively, a complex version of the sphere decoder is described, e.g., in B. Hochwald and S. ten Brink, "Achieving near-capacity on a multi-antenna channel," *IEEE Trans. Comm.*, pp. 389-399, March 2003. A complex version of the sphere decoder is also described in U.S. patent application Ser. No. 10/205,706, which was filed on Jul. 26, 2002 by B. M. Hochwald et al. under the title, "Method and Apparatus for Detection and Decoding of Signals Received from a Linear Propagation Channel," and which is hereby incorporated by reference herein in entirety.

The scalar $\tau$ is a design parameter that may be chosen according to various criteria. For example, if the data values are drawn from a signal constellation, $\tau$ can be chosen to provide a symmetric decoding region around the real or imaginary part of every signal constellation point. This is done by setting the value of $\tau$ according to the following equation:

$$\tau=2(|c|_{max}+\Delta/2),$$

where $|c|_{max}$ is the largest symbol magnitude in the constellation and $\Delta$ is the spacing between points of the constellation.

To reduce the effects of the perturbation vector l, $\tau$ can be increased. This has the effect of increasing the decoding region at the upper and lower extremes of the constellation. It should be noted, however, that whereas this may improve error performance in the extreme decoding regions, it may also impair overall error performance. It should also be noted that if τ is made too large, the solution to the minimization problem simply collapses to l=0. On the other hand, if τ is made smaller than $2|c|_{max}$, error-free coding becomes impossible, even in the absence of channel noise.

Table I, below, provides values of τ determined according to the above equation, for various types of unit-energy constellations:

TABLE I

| Constellation | BPSK | QPSK | 16-QAM | 64-QAM | 256-QAM | Uniform |
|---|---|---|---|---|---|---|
| τ | 4 | 2.8284 | 2.5298 | 2.4689 | 2.4543 | 2.4495 |

The column titled "Uniform" in the above table refers to the limiting case in which the symbols of the constellation have a continuous distribution along both the real and imaginary axes.

As noted above, it will often be advantageous, in preceding the signal, to apply a "regularized" channel inversion in place of the simple channel inversion $s=H^{-1}u$. The regularized channel inversion takes the form $s=H^*(HH^*+\alpha I)^{-1}u$. The coefficient α is an adjustable parameter. One useful criterion for setting α is maximization of the signal-to-interference-plus-noise ratio (SINR) at the individual users. Assuming that M=K and using a large-K approximation, we have theoretically predicted that when sending unperturbed signals s, nearly optimal results will be achieved when $$\alpha = \frac{K}{\rho},$$

where $$\rho = \frac{1}{\sigma^2},$$

and $\sigma^2$ is the additive noise variance. Numerical simulations have demonstrated that this value for α can, in fact, give excellent results over a wide range of values of K and ρ.

By combining regularized channel inversion with vector perturbation, it is possible to enjoy greater gains in total transmission rate than are obtained using either technique alone. However, the above formula for setting the value of α does not provide the optimal value when vector perturbation is used. We have found that to avoid excessive crosstatk, α should in general be set to be significantly smaller than the value prescribed by the above formula. For example, from numerical simulations to find error probabilities, we have found that when K=M=4, it desirable to set α at about $$\frac{1}{5\rho}.$$

Similarly, we have found that when K=M=10, α is desirably set at about $$\frac{1}{\rho}.$$

EXAMPLE

We performed numerical simulations of a system having four or ten base-station antennas and a like number of users. We assumed that the data to be transmitted was encoded by a rate-½ turbocode (two bits per user) using 16-QAM symbols. From our simulations, we determined the dependence of bit-error rate (BER) on ρ for signals preceded by regularized channel inversion, with and without vector perturbation. Our results are plotted in FIG. 5, where curves A and B are with vector perturbation, curves C and D are without vector perturbation, curves A and D are with K=10, and curves B and C are with K=4.

Figure 5:
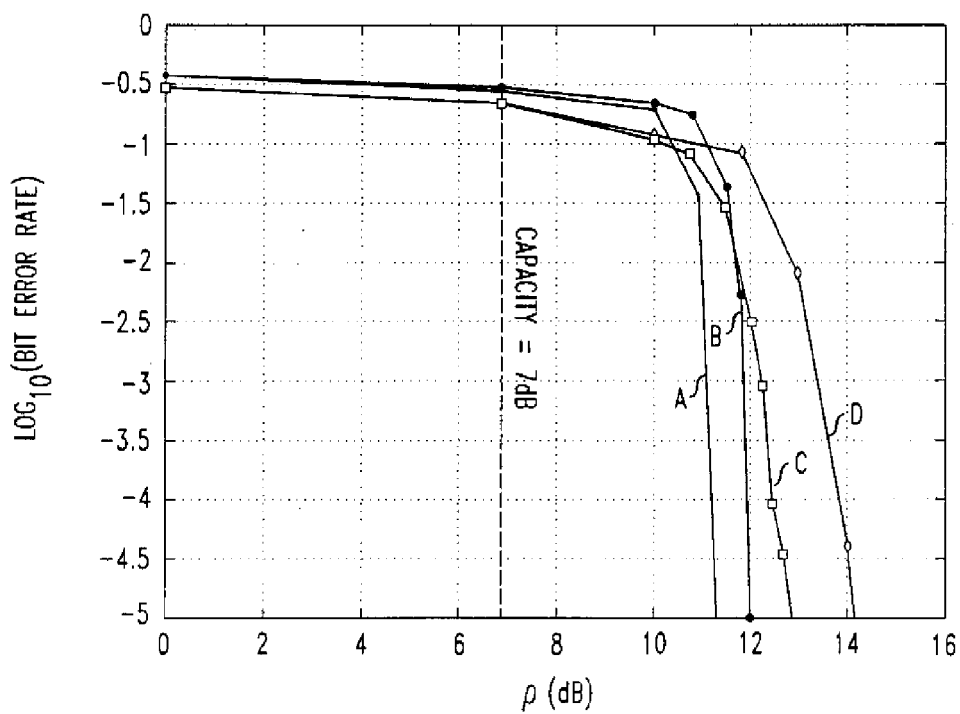
FIG. 5 is a graph showing certain results generated by the numerical modeling of a communication system employing the methods described herein, in which K=M, and the data to be transmitted is encoded by a rate-½ turbocode (two bits per user) using 16-QAM symbols. In the figure, the bit-error rate (BER) is plotted versus $\rho$, which is the inverse of the additive noise variance. Curves A and B are with vector perturbation, curves C and D are without vector perturbation, curves A and D are with K=10, and curves B and C are with K=4.

The position of the vertical line E in FIG. 5 is determined by assuming a fixed transmission rate of two bits per user for ten users, giving a total of 20 bits per channel use. Fundamental information theory provides a relationship between the sum capacity of the channel and inverse noise variance ρ. From that theoretical relationship, we determined that the sum capacity equals 20 bits per channel use when ρ is at the value indicated by line E, i.e., about 7 dB.

The above description and the figures to which it refers are illustrative and not intended to limit the scope of the invention.

For example, in other embodiments of the invention, the data vector is modulated onto a plurality of CDMA spreading sequences transmitted from a single antenna or from a multiple-antenna array. In such a case, the channel matrix H expresses the response of each user's receiver to each of the spreading sequences.

In still other embodiments of the invention, signal transmission is in the electrical domain. For example, each of a group of transmission elements is an electrically conductive connector or other element electrically continuous with an electric wire or cable for signal distribution to respective user premises, packaged so closely with the other elements as to permit electrical crosstalk. In such a case, the channel matrix H is the coupling matrix between the various electrical transmission elements.

In yet other embodiments of the invention, an optical router with multiple transmitters sharing a common wavelength and operating concurrently launches the optically modulated data vector into a multimode fiber for transmission to a plurality of users, each having, e.g., a single optical receiver. In such a case, the channel matrix H expresses the response of each user's optical receiver to each of the optical transmitters.

The invention claimed is:

1. A method, comprising:
   providing a data vector u which contains respective signal data destined for each of a plurality of users;
   conditioning the data vector; and
   transmitting the conditioned data vector from an array of multiple transmission elements,
   wherein the conditioning step includes adding a perturbation vector expressible as τl to the data vector u, in which τ is a positive real number and each component of the vector l is a complex number whose real and imaginary parts are both integers, thereby to form a perturbed data vector.

2. The method of claim 1, wherein the vector l is chosen by searching over a search space of integer-valued vectors for a vector that minimizes, over the search space, a measure of signal energy.

3. The method of claim 1, wherein the conditioning step further includes, after adding the perturbation vector, applying a linear transformation to the perturbed data vector.

4. The method of claim 3, wherein the linear transformation represents the inverse of a channel matrix.

5. The method of claim 3, wherein the linear transformation represents a regularized inverse of a channel matrix H, expressible in the form $H^*(HH^*+\alpha I)^{-1}$, wherein $H^*$ is the conjugate transpose of the matrix H, I is an identity matrix having the same dimension as $HH^*$, and $\alpha$ is a scalar.

6. The method of claim 1, wherein the conditioning step further comprises modulating the data vector onto a radio-frequency carrier, and the transmitting step comprises transmitting the conditioned data vector from a multiple-antenna array.

7. The method of claim 1, wherein the multiple transmission elements are electrically conductive elements electrically continuous with electric wires or cables for signal distribution to respective user premises.

8. The method of claim 1, wherein the multiple transmission elements are optical transmitters optically coupled to a multimode optical fiber.

9. A method, comprising:
providing a data vector u which contains respective signal data destined for each of a plurality of users;
conditioning the data vector; and
transmitting the conditioned data vector from one or more radio-frequency transmission antennas, wherein:
the conditioning step comprises adding a perturbation vector expressible as $\tau l$ to the data vector u, in which $\tau$ is a positive real number and each component of the vector l is a complex number whose real and imaginary parts are both integers, thereby to form a perturbed data vector; and
the conditioning step further comprises modulating the perturbed data vector onto a plurality of CDMA spreading sequences and modulating said sequences onto a radio-frequency carrier.

10. A method, comprising:
providing a data vector u which contains respective signal data destined for each of a plurality of K users, K a positive integer at least 2;
conditioning the data vector; and
transmitting the conditioned data vector from an array of multiple transmission elements,
wherein the conditioning step comprises providing an estimate $\sigma^2$ of receiver noise variance at the users, and applying to the data vector a linear transformation representing a regularized inverse of a channel matrix H, expressible in the form $H^*(HH^*+\alpha I)^{-1}$, wherein $H^*$ is the conjugate transpose of the matrix H, I is an identity matrix having the same dimension as $HH^*$, and $\alpha$ is approximately the product $K\sigma^2$.

* * * * *